US007852235B1

(12) United States Patent
Johnson et al.

(10) Patent No.: US 7,852,235 B1
(45) Date of Patent: Dec. 14, 2010

(54) HIGH INTEGRITY COMPUTING VIA INPUT SYNCHRONIZATION SYSTEMS AND METHODS

(75) Inventors: Douglas R. Johnson, Cedar Rapids, IA (US); James J. Corcoran, Cedar Rapids, IA (US); Eric J. Danielson, Iowa City, IA (US); John W. Roltgen, Cedar Rapids, IA (US); Mark A. Kovalan, Cedar Rapids, IA (US); Corydon J. Carlson, Cedar Rapids, IA (US); John L. Persick, Robins, IA (US); Cleveland C. Gilbert, Cedar Rapids, IA (US); Samir S. Hemaidan, Cedar Rapids, IA (US); Shawn M. Stanger, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 411 days.

(21) Appl. No.: 12/150,402

(22) Filed: Apr. 28, 2008

(51) Int. Cl.
*G08B 21/00* (2006.01)
*G08B 29/00* (2006.01)
*G06F 11/00* (2006.01)
*G01C 23/00* (2006.01)

(52) U.S. Cl. .................... 340/945; 340/506; 340/507; 340/508; 340/522; 701/3; 701/14; 714/11; 714/12

(58) Field of Classification Search ............... 340/945, 340/507, 508
See application file for complete search history.

(56) References Cited

U.S. PATENT DOCUMENTS

| 4,622,667 | A | 11/1986 | Yount |
| 4,799,159 | A | 1/1989 | Davidson et al. |
| 5,113,522 | A | 5/1992 | Dinwiddie, Jr. et al. |
| 5,325,517 | A | 6/1994 | Baker et al. |
| 6,469,654 | B1 | 10/2002 | Winner et al. |
| 6,883,121 | B1 | 4/2005 | Jensen et al. |
| 7,209,809 | B2 | 4/2007 | Yeh |
| 2005/0085957 | A1 | 4/2005 | Yeh |
| 2007/0083301 | A1 | 4/2007 | Yeh |
| 2007/0109745 | A1 | 5/2007 | Yeh |
| 2007/0300231 | A1 | 12/2007 | Aguilar et al. |

*Primary Examiner*—Donnie L Crosland
(74) *Attorney, Agent, or Firm*—Matthew J. Evans; Daniel M. Barbieri

(57) ABSTRACT

A method of comparing output information from dissimilar processors includes storing a task in a first memory and storing the task in a second memory at substantially the same time as the first memory. The time of the storing being is controlled by a first arbitration logic and a second arbitration logic. The method also includes receiving the task by a first processor from the first memory and receiving the task by a second processor from the memory at substantially the same time as the first processor. The time being received is controlled by a first arbitration logic and a second arbitration logic. The second processor being dissimilar to the first processor. The method further includes computing a first output by the first processor based on the task and computing a second output by the second processor based on the task. The method still further includes, synchronizing the first and second outputs so that the first and second outputs are output at substantially the same time. The synchronizing is controlled by the first and second arbitration logic.

20 Claims, 5 Drawing Sheets

HIGH INTEGRITY COMPUTING VIA INPUT SYNCHRONIZATION SYSTEMS AND METHODS

BACKGROUND

As the integrity of flight deck and auto flight platforms for aircraft increases, e.g. 10 to the minus 10, the requirement to synchronize dissimilar processors becomes necessary. Also, it may be advantageous to conserve space and minimize equipment to utilize dissimilar processors to reduce the number of redundant processors conventionally being used. This may be reflected in both in the number of Line Replaceable Units (LRU's) utilized and the number of processors used. In fly-by-wire applications, it is important to maintain the ability to provide the comparison of the information for input/output data flow with the correct bit-by-bit review and thereby determine the integrity of the processing platform and the application requirements for the aircraft control. In other situations the use of dissimilar processors may also prove to be advantageous as compared with conventional systems. For example, it may be advantageous to use dissimilar processors in achieving display requirements for the Engine Indication and Crew Alerting System (EICAS) control of circuit breakers. In order to implement dissimilar processor synchronization, it may be necessary to devise software and implement software/hardware combinations which enable such synchronization.

Accordingly, there is a need for systems and methods of providing software or software/hardware combinations which effectuate synchronization of dissimilar processors and making comparisons of the output of those dissimilar processors to provide integrity monitoring and integrity control.

The techniques herein below extend to those embodiments which fall within the scope of the appended claims, regardless of whether they accomplish one or more of the above-mentioned needs.

SUMMARY

An exemplary embodiment relates to a flight control system. The flight control system includes an output device. The flight control system also includes a first processor and a second processor. The second processor is dissimilar to the first processor. A first memory is coupled to the first processor and a second memory is coupled to the second processor. A first arbitration device is coupled to the first processor and a second arbitration device is coupled to the second processor. The second arbitration device is configured to coordinate transaction synchronization with the first arbitration device and the first arbitration device is configured to coordinate transaction synchronization with the second arbitration device. The first arbitration device has a first arbitration logic programmed thereon. The second arbitration device has a second arbitration logic programmed thereon. The first arbitration logic and the second arbitration logic ensure that an event data is stored in the first memory at substantially the same time as the event data is stored in the second memory.

Another exemplary embodiment relates to a method of comparing output information from dissimilar processors. The method includes receiving a task by a first processor and receiving the task by a second processor, at substantially the same time as the first processor. The time being received is controlled by a first arbitration logic and a second arbitration logic. The second processor is dissimilar to the first processor. The method also includes computing a first output by the first processor based on the task and computing a second output by the second processor based on the task. The method also includes synchronizing the first and second outputs so that the first and second outputs are output at substantially the same time. The synchronizing is controlled by the first and second arbitration logic.

Further, an exemplary embodiment relates to a method of comparing output information from dissimilar processors. The method includes storing a task in a first memory and storing the task in a second memory at substantially the same time as the first memory. The time of the storing is controlled by a first arbitration logic and a second arbitration logic. The method also includes receiving the task by a first processor from the first memory and receiving the task by a second processor from the memory at substantially the same time as the first processor. The time received is controlled by a first arbitration logic and a second arbitration logic. The second processor is dissimilar to the first processor. The method further includes computing a first output by the first processor based on the task and computing a second output by the second processor based on the task. The method still further includes synchronizing the first and second outputs so that the first and second outputs are output at substantially the same time. The synchronizing is controlled by the first and second arbitration logic.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
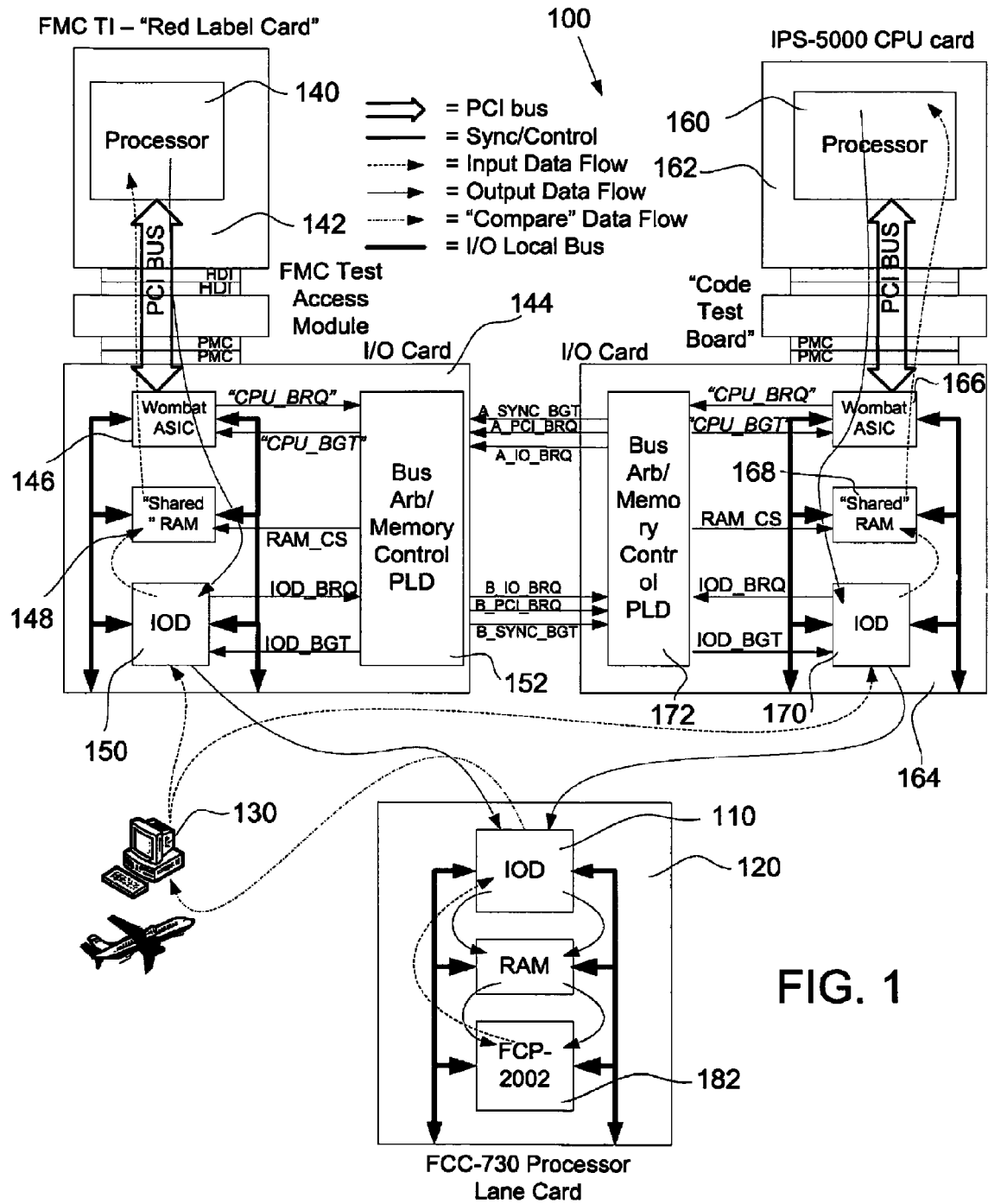
FIG. 1 is an exemplary block diagram of a flight control application in accordance with an exemplary embodiment.
Figure 2:
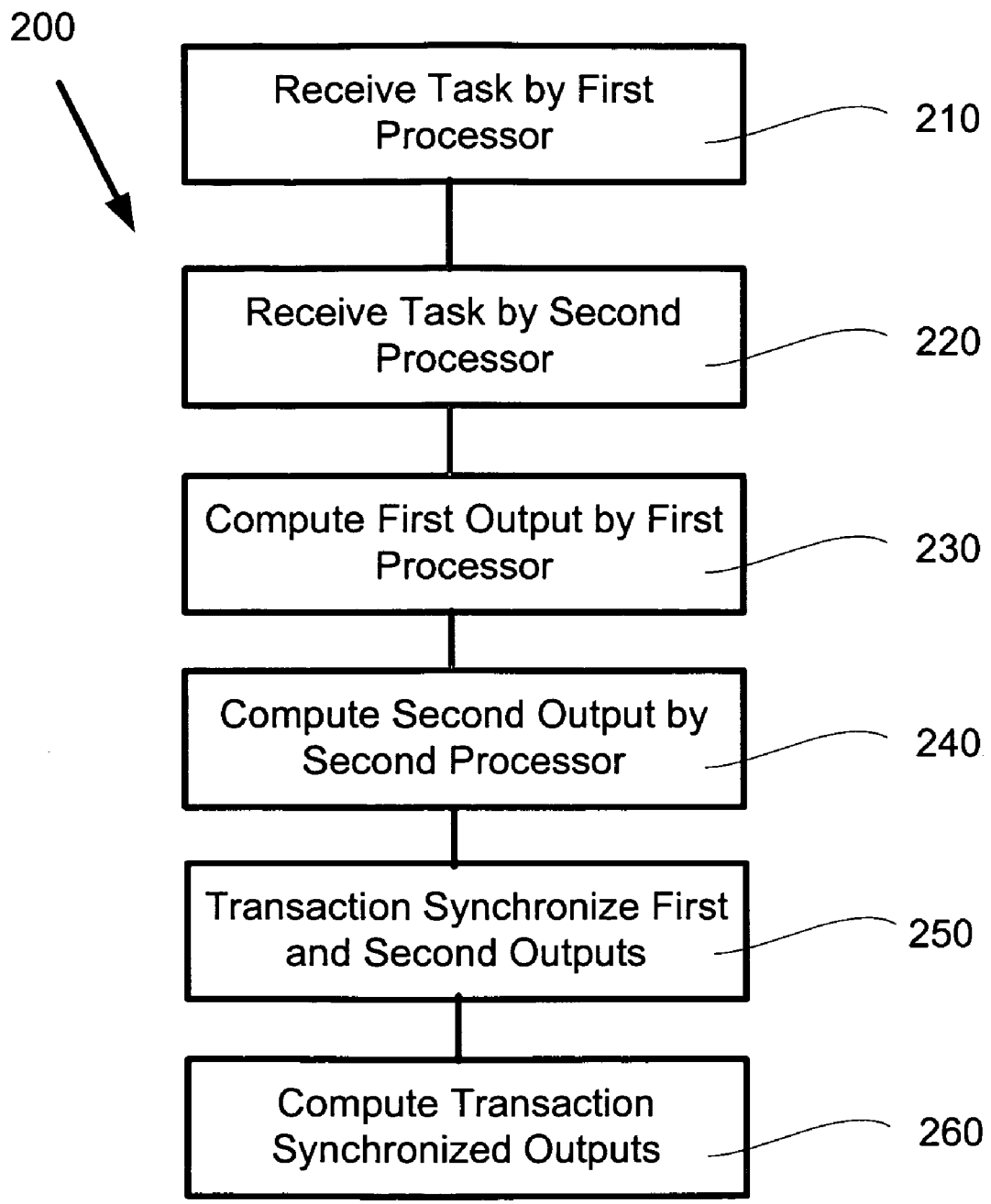
FIG. 2 is an exemplary process diagram of a transaction synchronization process in accordance with an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In fly-by-wire applications two major concerns are important to the certification and reliability of such a system. These concerns include integrity, i.e., in the system configured to be relatively fail-safe or fail-operative; and availability, i.e., if one device fails the aircraft can still be controlled. Typically in conventional systems redundant systems may be used which have the same processors. However, such systems have the disadvantage that the failure may be the same in the same processors. Thus, in such systems, multiple redundant systems may be used to help maintain reliability. Because of the disadvantages and shortcomings of conventional redundant processor systems, it may be advantageous to utilize redundant processors such that the redundant processors are dissimilar, that is having different clock speeds, different register sizes, different architectures, etc. However, to maintain such a system requires synchronization of the two dissimilar processors and such synchronization requires sophisticated software or a combination of software and hardware.

In accordance with an exemplary embodiment, this synchronization can be implemented in a flight control system 100 of FIG. 1. Flight control system 100 includes an input/output device 110 which may be coupled to a comparator processor card 120. Input/output device 110 includes a connection (wired or wireless) to a device which may be a computer 130, an actuator, a display, a flight management system, or the like, diagrammatically represented here generally as computer 130.

A first processor 140 may be part of a card 142 and coupled to an I/O card 144. I/O card 144 may include an ASIC or other processor 146, a shared RAM 148, and an input/output device (IOD) 150. Each of these may be coupled to an arbitration device 152. Similarly, a second processor, the second processor 150 may be dissimilar to first processor 140. Such dissimilarity may be in clock speed, processor architecture, register size, etc. Second processor 160 may also be coupled to a card 162 and further electrically coupled to an arbitration card 164. Second arbitration card 164 may include an ASIC or other processor 166, a shared memory 168, an input/output device 170 and an arbitration device 172.

The second arbitration device 164 is configured to coordinate transaction synchronization with the first arbitration device and the first arbitration device is configured to coordinate transaction synchronization with the second arbitration device.

Comparator processor card 120 may be coupled to the first arbitration card 144 and the second arbitration card 174. Comparator processor card 120 may be being configured to compare transaction synchronized outputs of the first and second processors and a comparator processor 182 may effectuate a command to the output device if the comparison is valid. However, if the comparison is not valid, various actions may be taken including but not limited to requesting the task again, shutting down operation of or communication with the processors, or providing operational alerts or warnings.

In accordance with an exemplary embodiment, the system 100 may be applied in various applications including but not limited to flight control applications where the processor output is used to effectuate movement of an actuator for an aircraft. Further, system 100 may be applied such that the output is used for communication with a display device, a traffic collision avoidance system (TCAS), an enhanced ground proximity warning system (EGPWS) or the like.

In accordance with an exemplary embodiment, the processors may be dissimilar in various ways including but not limited to the first processor and the second processor running at different clock speeds, or the first processor and the second processor having different processor architectures. Also, in accordance with an exemplary embodiment, the first arbitration device and the second arbitration device may be programmable logic devices (PLDs).

Exemplary embodiments also relate to methods of comparing output information from dissimilar processors using systems like system 100. These methods 200 include receiving a task by a first processor (process 210) receiving the task by a second processor (process 220). The second processor, as discussed above is dissimilar to the first processor.

A first output is computed by the first processor based on the task (process 230. A second output by the second processor is computed based on the task (process 240). The first and second outputs by the first and second arbitration devices are transaction synchronized (process 250) such that outputs corresponding to the same task are delivered virtually simultaneously to the comparator processor. The comparator processor then compares the transaction synchronized outputs of the first and second processors (process 260).

In accordance with an exemplary embodiment, the process may also include indicating by the comparator processor a result of the comparison. The result may be in the form of a valid or invalid indication or may provide an error between the outputs. If the comparison is valid or the error is within a predetermined range, the output may be provided to the output receiving device which may be an actuator, a display device, a flight computer, etc.

Figure 3:
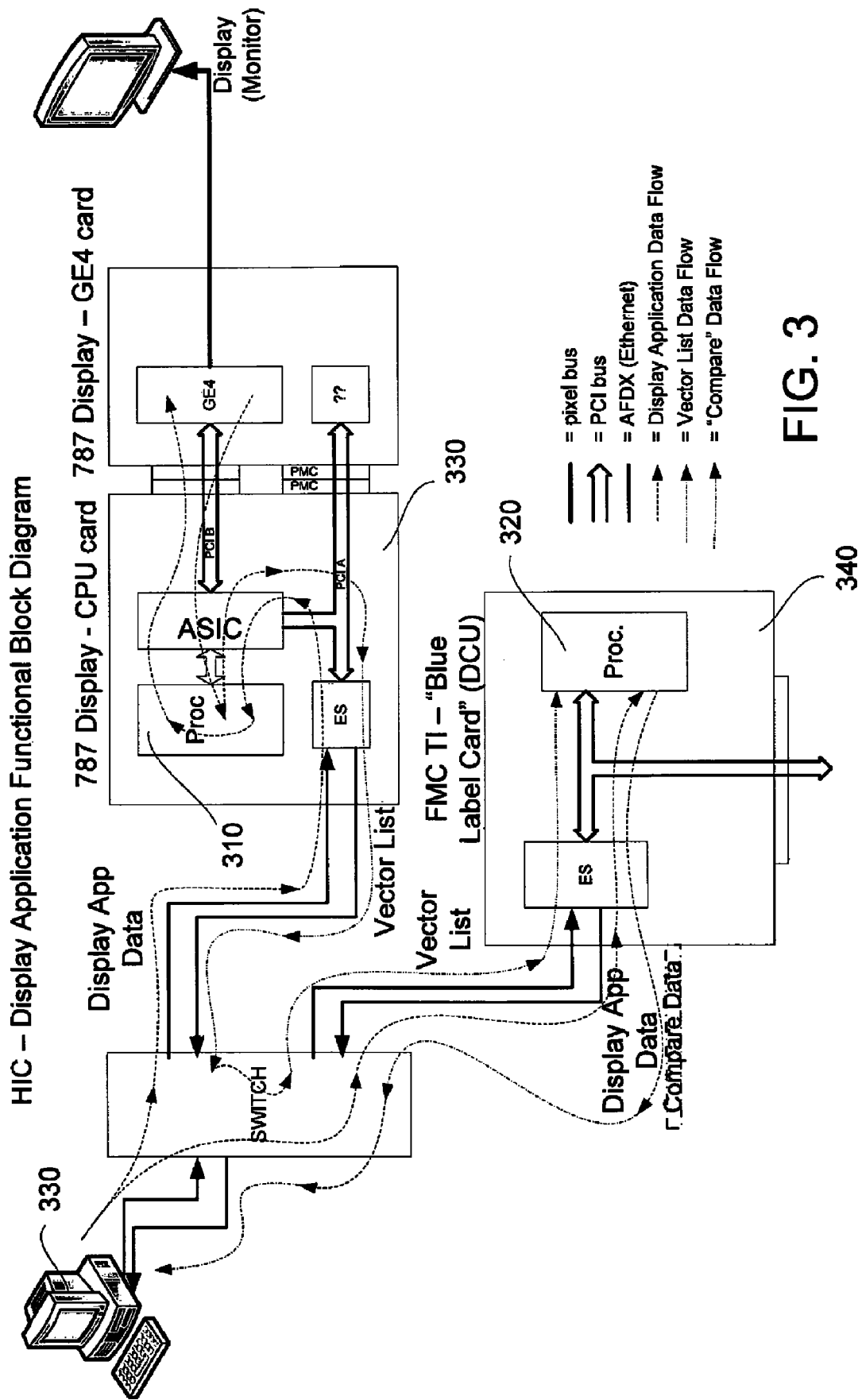
FIG. 3 is an exemplary diagram of a display system in accordance with an exemplary embodiment.

In accordance with another exemplary embodiment, the transaction synchronized comparison system may be applied to a display system 300 as illustratively depicted in FIG. 3. Display system 300 uses two dissimilar processors 310 and 320. Computer 330 is representative of the device on which the display application software resides. As tasks are requested, a vector list is generated by processor 310 and associated hardware. The vector list is delivered to processor 320. In one exemplary embodiment, processor 320 both computes its own version of the vector list to compare with the vector list from processor 310 and compares the two vector lists. In another exemplary embodiment the comparison may be carried out on a separate processor. Transaction synchronization is carried out on each of cards 330 and 340 in a manner similar to that described with regard to FIG. 1. In accordance with an exemplary embodiment, the architecture depicted in FIG. 3 is not only applicable to display systems, but may be applied to other systems including actuator systems, flight control systems, etc.

One of the plurality of benefits achieved by the transaction synchronization system is help in minimizing the amount of equipment needed. For example, the systems described may be implemented on a smaller number of line replaceable units (LRU's) than for conventional systems.

As described above, the High Integrity Computing (HIC) platform utilizes two commercial off-the-shelf (COTS) processors to compute independent outputs which are subsequently compared by an independent monitor. The premise of the HIC system is that if the two COTS processors can use bit-for-bit identical input data in their respective calculations then their results will be bit-for-bit identical as well. The bit-by-bit equivalence of the processor outputs radically simplifies the design of the output comparator by eliminating all threshold comparisons (in time and magnitude).

In the HIC system the synchronization of the input data to the system is of paramount importance. It must be realized that not only are the two COTS processors running asynchronous to each other, they are each asynchronous to the outside world (i.e. input data sources) as well. Therefore, the HIC architecture employs a novel technique to not only synchronize the data entering the system but also synchronizes the processors access to the input data space.

The operation of each lane of the HIC architecture can be summarized as follows. The arbitration logic such as that running on PLP 152 and 172, ensures that (1) data entering the lane is stored in "shared RAM" at exactly the same time as the other lane, (2) the processor in the lane reads data from the "shared RAM" at exactly the same time as the other lane, and (3) the processor in the lane outputs data at exactly the same time.

The use of the phrase "exactly at the same time" is used to connote substantially close in time such that other steps are not taken between the time of the two steps being carried out. Because the lanes are synchronous, the operations in each respective lane are not precisely coupled. Rather, the same event in each lane happens somewhere within a small time interval. By design, the hardware guarantees that both events (one in each lane) take place before the next hardware/software event can occur thus accomplishing the synchronization of both incoming and out going data.

The heart of the HIC design is the Bus Arbitration/Memory Control PLDs 152 and 172 of FIG. 1. As depicted, each lane contains an identical copy of this device. The following discussion focuses on the left half of the block diagram of FIG. 1 but the same scenario is occurring on the right hand side in parallel.

For example, for data entering the system, and being put into shared RAM 148, the following scenario applies. Assume the Bus Arbitration/Memory Control PLD 152 starts from its "idle" state.

Serial data enters the system via an IOD ASIC 150

When data is received by the IOD 150, IOD 150 issues a request to use its parallel bus (IOD_BRQ) for unloading the incoming data into shared RAM 148.

The IOD's request to use its parallel bus (IOD_BRQ) is routed to the Bus Arbitration/Memory Control PLD 152.

Bus Arbitration/Memory Control PLD 152 passes the IOD bus request onto the other lane (B_IO_BRQ). Meanwhile, lane A is passing its IOD bus request to this lane.

When the Bus Arbitration/Memory Control PLD 152 recognizes that both its own IOD 150 and the other IOD 170 are requesting the bus, the Bus Arbitration/Memory Control PLD 152 issues a corresponding bus grant (B_SYNC_BGT). This is an indication to the other lane that control of the parallel bus is about to be granted to the requestor.

When the Bus Arbitration/Memory Control PLD 152 recognizes that both its own IOD 150 and the other IOD 170 have been granted the bus it passes this information to the IOD 150 as a bus grant (IOD_BGT) in response the IOD's original bus request.

At this point, the respective IOD's each have control of their respective local bus and the incoming data is substantially simultaneously unloaded from the IOD into the shared RAM. Hardware prevents the CPU from accessing the shared RAM 148 and 168 while the IOD 150 and 170 are unloading so both shared RAMs remain identically matched.

When IOD 150 has completed its unloading of the incoming data, it removes it bus request (IOD_BRQ).

Removal of the IOD bus request subsequently causes the removal of the respective cross lane bus grant (B_SYNC_BGT) and cross lane bus request (B_IOD_BRQ).

When the Bus Arbitration/Memory Control PLD 152 recognizes that both its own IOD 150 and the other IOD 170 have had their bus grants removed, the Bus Arbitration/Memory Control PLD 152 returns to the idle state.

For data in shared RAM being accessed (read/written) from the CPU 140, the following scenario applies. Assume the Bus Arbitration/Memory Control PLD 152 starts from its "idle" state.

The WOMBAT ASIC 146 (acting as an address decoder on behalf of the CPU) issues a request to use its parallel bus (CPU_BRQ) for accessing the shared RAM.

The CPU's request to use the parallel 10 bus (CPU_BRQ) is routed to the Bus Arbitration/Memory Control PLD 152.

The Bus Arbitration/Memory Control PLD 152 passes the CPU bus request onto the other lane (B_CPU_BRQ). Meanwhile, lane A is passing its CPU bus request to this lane.

When the Bus Arbitration/Memory Control PLD 152 recognizes that both its own CPU 140 and the other CPU 160 are requesting the bus, the Bus Arbitration/Memory Control PLD 152 issues a corresponding bus grant (B_SYNC_BGT). This is an indication to the other lane that control of the parallel bus is about to be granted to the requestor.

When the Bus Arbitration/Memory Control PLD 152 recognizes that both its own CPU 140 and the other CPU 160 have been granted the IO bus it passes this information to the CPU 152 (via the WOMBAT) as a bus grant (CPU_BGT) in response the CPU's original bus request.

At this point, the respective CPU's each have control of their respective 10 bus and the data is substantially simultaneously accessed from the shared RAM. Hardware prevents the IOD's from accessing the shared RAM while the CPU is accessing the shared RAM so both processor get/put identically matched.

When the CPU has completed its accessing of the shared RAM, it removes its bus request (CPU_BRQ).

Removal of the CPU bus request subsequently causes the removal of the respective cross lane bus grant (B_SYNC_BGT) and cross lane bus request (B_CPU_BRQ).

When the Bus Arbitration/Memory Control PLD 152 recognizes that both its own CPU 140 and the other CPU 160 have had their bus grants removed, the Bus Arbitration/Memory Control PLD 152 returns to the idle state.

For data being output from the system, the CPU scenario described above applies. However, the data is being written to an IOD transmit queue instead of the shared RAM.

Figure 4:
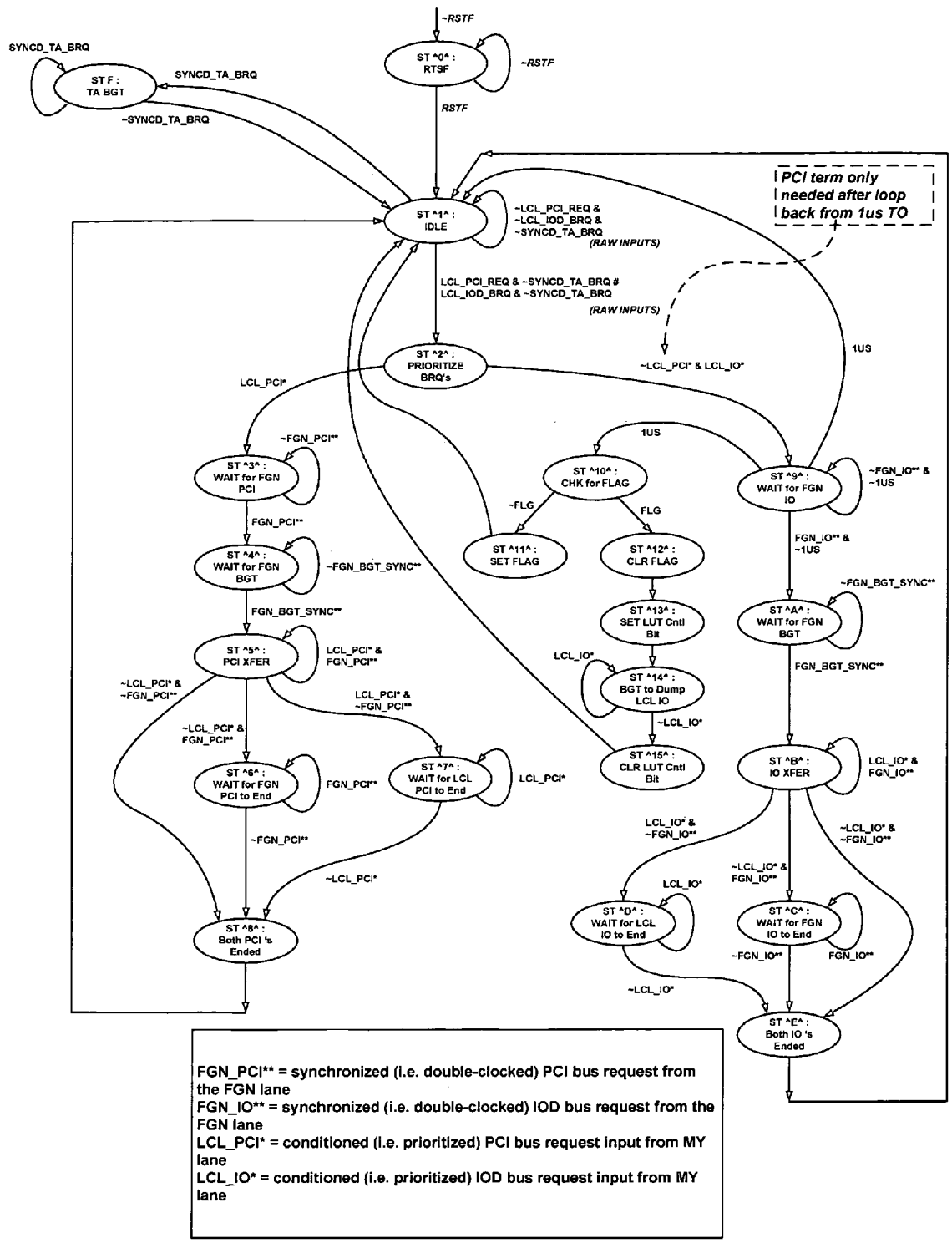
FIG. 4 is an exemplary state machine diagram in accordance with an exemplary embodiment.

The scenarios described above are only applicable when one potential bus master is requesting the bus but not both (IOD_BRQ or CPU_BRQ) at the same time. Due to the asynchronous nature of I/O it is inevitable that this case will occur. The design of the hardware handles this case by invoking a fixed priority scheme whereby the processor is always the highest priority requestor. See state machine diagram FIG. 4, State 2.

Also the scenarios above do not handle the case where one lane has its IOD requesting to use the shared RAM and one lane has its processor requesting to use the shared RAM. This deadlock must be broken or else one lane would wait indefinitely for the other lane to sync up. This situation is mitigated with a timeout function built into the hardware. Essentially the hardware detects that this request "split" has existed for greater than 1 microsecond, for example. If this is true the state machine that is in the I/O request path cycles back to the top and is given the opportunity to take the CPU request path, hence synchronizing both lanes on a CPU access.

Figure 5:
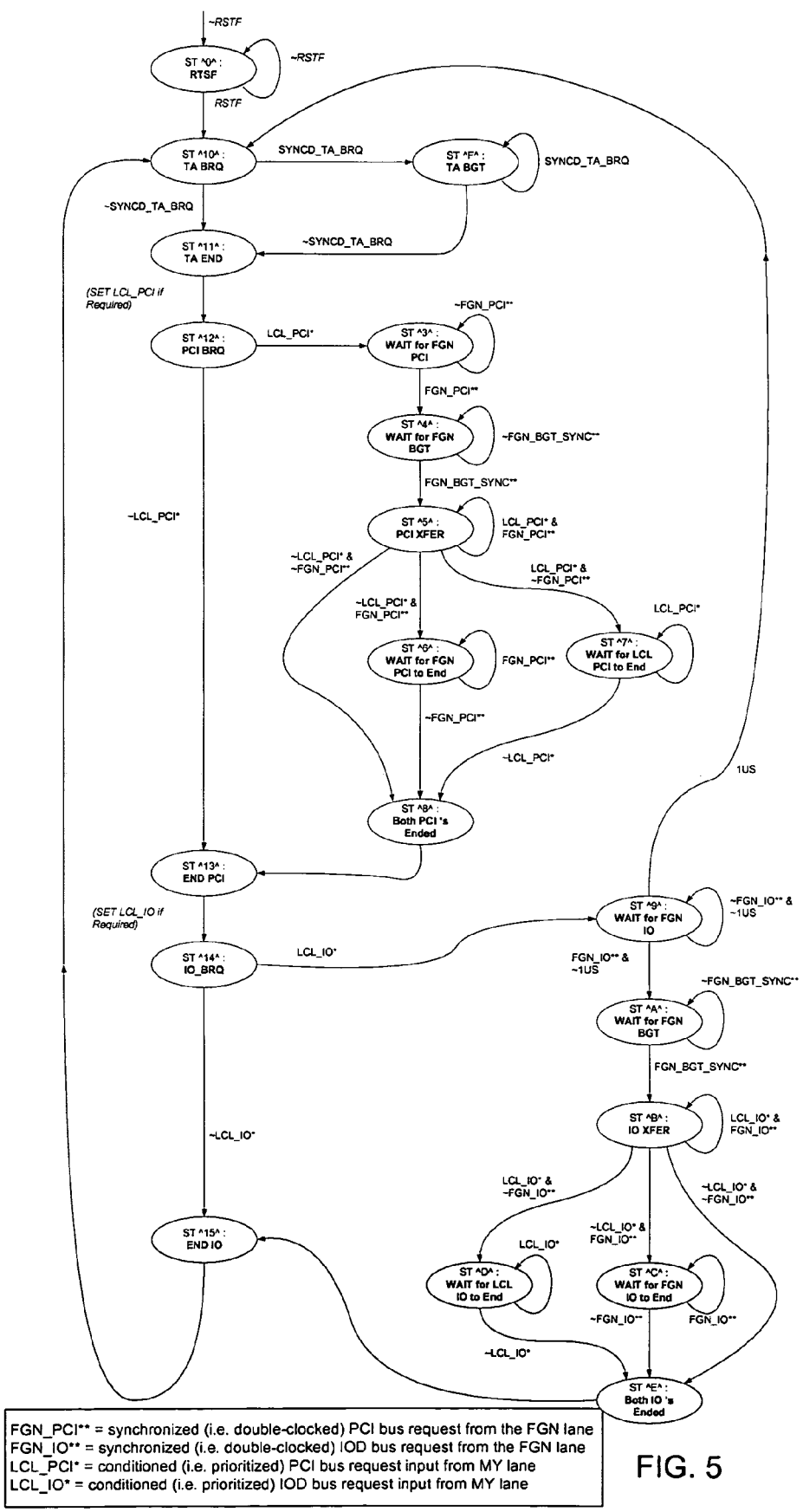
FIG. 5 is an exemplary state machine diagram in accordance with an exemplary embodiment.

Another situation that is mitigated by the hardware is when one lane receives a valid input 429 word and the other lane rejects the input 429 word (e.g. due to random noise). If allowed to continue normally the hardware in the lane receiving the valid word would continue and unload this word in the shared RAM. Meanwhile the other lane, with the rejected word, would have nothing to unload. This would ultimately lead to mis-matched data in the shared RAMS in the respective lane and eventually an output mis-compare would occur. In this case the, the hardware is design to purge the valid word in order to keep synchronization in the input data stream, see state machine states, FIG. 5, States 10-15.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A flight control system, comprising:
   an output device;
   a first processor;
   a second processor, the second processor being dissimilar to the first processor;
   a first memory coupled to the first processor;
   a second memory coupled to the second processor;
   a first arbitration device coupled to the first processor;
   a second arbitration device coupled to the second processor, the second arbitration device configured to coordinate transaction synchronization with the first arbitration device and the first arbitration device configured to coordinate transaction synchronization with the second arbitration device, the first arbitration device having a first arbitration logic programmed thereon, the second arbitration device having a second arbitration logic programmed thereon, the first arbitration logic and the second arbitration logic ensuring that an event data is stored in the first memory at substantially the same time as the event data is stored in the second memory.

2. The flight control system of claim 1, wherein the first arbitration logic and the second arbitration logic ensure that the first processor reads the event data from the first memory and the second processor reads the event data from the memory at substantially the same time.

3. The flight control system of claim 1, wherein the first arbitration logic and the second arbitration logic ensure that the first processor and the second processor process the event data and outputs a first event output from the first processor and outputs a second event output from the second processor at substantially the same time.

4. The flight control system of claim 3, further comprising:
   a comparator processor coupled to the first arbitration device and the second arbitration device, the comparator processor being configured to compare the first event output and the second event output.

5. The flight control system of claim 4, wherein the comparator processor effectuates a command to the output device if the comparison is valid.

6. A method of comparing output information from dissimilar processors, comprising:
   receiving a task by a first processor;
   receiving the task by a second processor, at substantially the same time as the first processor, the time being received being controlled by a first arbitration logic and a second arbitration logic, the second processor being dissimilar to the first processor;
   computing a first output by the first processor based on the task;
   computing a second output by the second processor based on the task;
   synchronizing the first and second outputs so that the first and second outputs are output at substantially the same time, the synchronizing being controlled by the first and second arbitration logic.

7. The method of claim 6, further comprising:
   comparing by a comparator processor the transaction synchronized outputs of the first and second processors.

8. The method of claim 7, further comprising:
   indicating by the comparator processor a result of the comparison.

9. The method of claim 8, further comprising:
   effectuating a command if the comparison is valid.

10. The method of claim 8, further comprising:
    indicating by the comparator processor a result of the comparison, the result being whether the comparison between the first and second outputs is valid or invalid.

11. The method of claim 8, further comprising:
    indicating by the comparator processor a result of the comparison; and
    outputting at least one of the first or second outputs in response to the result, the output being provided to at least one actuator.

12. The method of claim 8, further comprising:
    indicating by the comparator processor a result of the comparison; and
    outputting at least one of the first or second outputs in response to the result, the output being provided to at least one display device.

13. A method of comparing output information from dissimilar processors, comprising:
    storing a task in a first memory;
    storing the task in a second memory at substantially the same time as the first memory, the time of the storing being controlled by a first arbitration logic and a second arbitration logic;
    receiving the task by a first processor from the first memory;
    receiving the task by a second processor from the memory at substantially the same time as the first processor, the time being received being controlled by a first arbitration logic and a second arbitration logic, the second processor being dissimilar to the first processor;
    computing a first output by the first processor based on the task;
    computing a second output by the second processor based on the task; and synchronizing the first and second outputs so that the first and second outputs are output at substantially the same time, the synchronizing being controlled by the first and second arbitration logic.

14. The method of claim 13, further comprising:
comparing by a comparator processor the transaction synchronized outputs of the first and second processors.

15. The method of claim 14, further comprising:
indicating by the comparator processor a result of the comparison.

16. The method of claim 13, further comprising:
reading the task from a first memory; and
reading the task from a second memory at substantially the same time,
wherein the reading is controlled by the first arbitration logic and the second arbitration logic.

17. The method of claim 15, further comprising:
effectuating a command if the comparison is valid.

18. The method of claim 15, further comprising:
indicating by the comparator processor a result of the comparison, the result being whether the comparison between the first and second outputs is valid or invalid.

19. The method of claim 15, further comprising:
indicating by the comparator processor a result of the comparison;
outputting at least one of the first or second outputs in response to the result.

20. The method of claim 15, further comprising:
indicating by the comparator processor a result of the comparison; and
outputting at least one of the first or second outputs in response to the result, the output being provided to at least one actuator.

* * * * *